United States Patent
Thorpe

[15] 3,656,306
[45] Apr. 18, 1972

[54] METHOD OF DEHYDRATING WET SOIL

[72] Inventor: Ervin T. Thorpe, Des Moines, Iowa

[73] Assignee: Des Moines Asphalt Paving Company, Des Moines, Iowa

[22] Filed: Nov. 16, 1970

[21] Appl. No.: 89,627

[52] U.S. Cl. ................................................61/36, 94/22
[51] Int. Cl. ......................................................E02d 3/12
[58] Field of Search ..........................61/36, 35; 94/22, 42

[56] References Cited

UNITED STATES PATENTS 2,929,219  3/1960  Degen...........................61/36 R Primary Examiner—David J. Williamowsky
Assistant Examiner—Philip C. Kannan
Attorney—Zarley, McKee & Thomte

[57] ABSTRACT

The method of dehydrating wet soil by heating aggregate, spreading the heated aggregate on the wet soil to be dehydrated, and then cutting a plurality of slits in the soil to permit the heated aggregate to move into the slits.

8 Claims, 4 Drawing Figures

PATENTED APR 18 1972

3,656,306

INVENTOR
ERVIN T. THORPE
BY
Farley, McKee & Thornte
ATTORNEYS

METHOD OF DEHYDRATING WET SOIL

Many paving and similar construction projects incur delays when inclement weather provides excessive moisture for the ground soil upon which the asphalt or concrete paving material is to be supplied. The method of this invention provides an unique way to dehydrate such soil in a very short time, thus reducing delays in construction. This method contemplates the spreading of a heated aggregate material over the wet ground surface, and thence cutting a plurality of parallel slits in the wet soil, whereupon the heated aggregate falls into the slits. The heated aggregate "bakes" the soil and causes the moisture in the soil to evaporate.

This invention consists in the method or process whereby the objects contemplated are attained as hereinafter more fully set forth, specifically pointed out in the claims, and illustrated in the accompanying drawings, in which:

Figure 1:
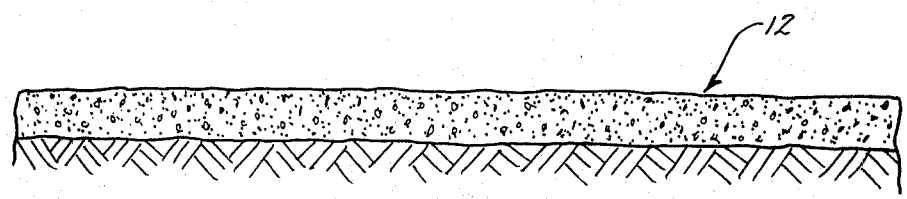
FIG. 1 is a sectional view through a layer of heated aggregate spread on a wet ground surface.
Figure 2:
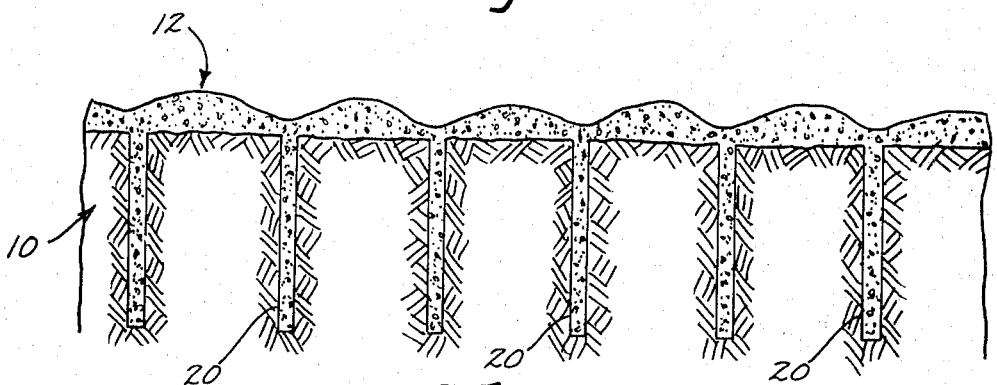
FIG. 2 is a sectional view through the terrain of FIG. 1 after the vertical slits have been cut in the soil and the aggregate has fallen into the slits.

The numeral 10 generally designates the wet soil to be dehydrated, and the numeral 12 generally designates the aggregate material which is used in this method. The aggregate material may assume a plurality of identities, but it has been found that fine natural sand serves the intended purpose very well. In addition, crushed limestone having particles of a minimum size which would pass −200 screen, and a maximum size of three-quarters inches in diameter are also successful.

The aggregate 12 is heated by any convenient means to a temperature of between 125° and 600° Fahrenheit. The preferred temperature range is 300° to 500° Fahrenheit. After being so heated, the aggregate is spread on the wet ground surface in a layer approximately 3 to 4 inches thick.

Any convenient scarifier tool 14 can then be employed to cut slits in the wet ground soil. The tool 14 is comprised of horizontal beam 16 with a plurality of downwardly extending teeth 18. The teeth 18 are approximately 1 inch wide and are spaced approximately 8 to 10 inches apart. The tool 14 is normally mounted beneath any appropriate prime mover, and is hydraulically lowered into the soil. The forward movement of the vehicle causes the teeth 18 to create the slits 20. The slits 20 preferably have a depth of 10 to 20 inches, with a preferred depth of approximately 14 inches. The tool 14 creates slits which are 8 to 10 inches apart and which are approximately 1 inch in width. These general proportions have been found to be extremely suitable in the dehydration process of this invention.

Figure 3:
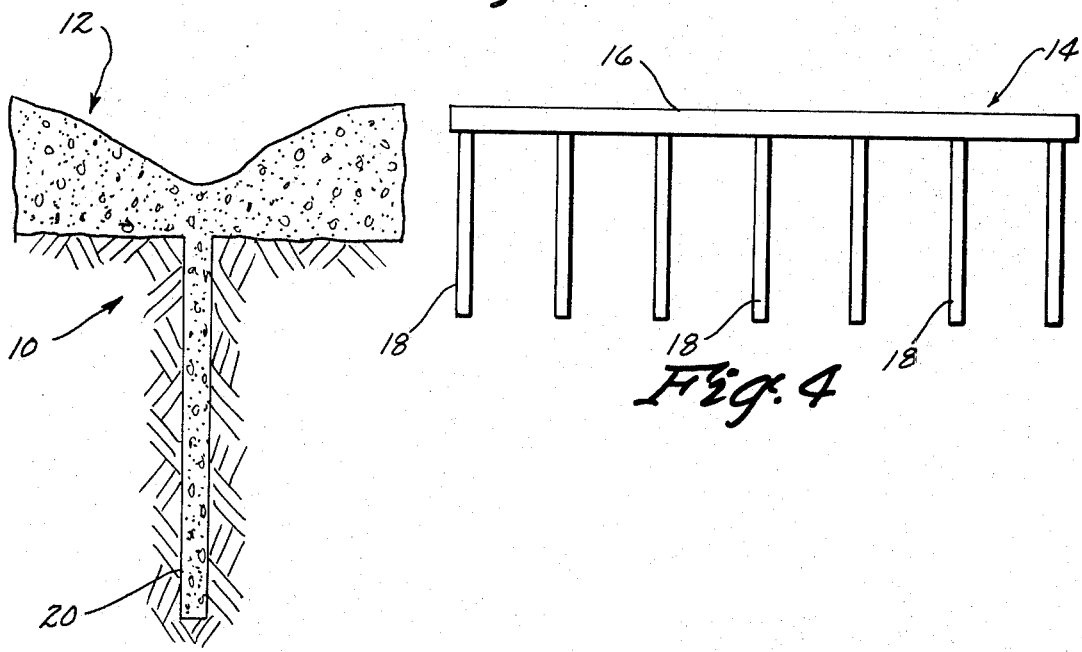
FIG. 3 is an enlarged scale sectional view through a slit in the soil which has been filled with heated aggregate.
Figure 4:
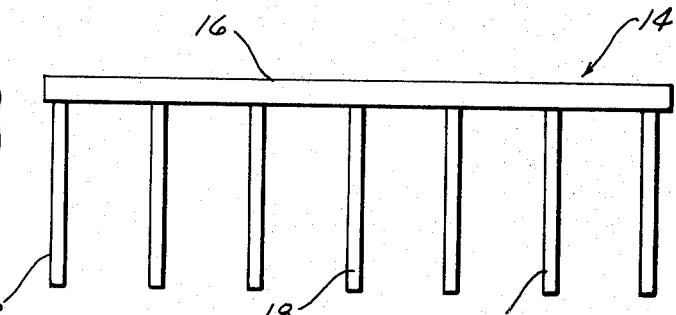
FIG. 4 is a front elevational view of a typical scarifier tool which can be used to cut slits in the soil.

As the slits are being formed, the heated aggregate falls into the slits as more clearly shown in FIG. 3. Some residue of heated aggregate may be left on the horizontal ground surface, but this factor is not critical to the invention. The wet soil between the slits 18 becomes heated, and the moisture therein is rapidly evaporated therefrom. In practice, steam rapidly radiates from the soil to such an extent that the terrain being treated is obscured from view.

The above described slits were imposed on wet soil covered with approximately 4 inches of the above-described limestone aggregate which had been heated to a temperature of 500° Fahrenheit. The soil before treatment had a moisture content of 26 percent. Twelve hours after the aggregate had been deposited on the soil and the slits imposed therein, the moisture content of the soil had been reduced to 7 percent. The soil between the slits at the ground surface normally will still feel warm to the touch 12 hours after the process has begun.

It is seen that the foregoing method will greatly accelerate the dehydration of wet soil conditions, and will thus reduce costly delays in many different types of construction projects. This invention is not limited to any precise type of aggregate material, although it is preferred that the texture and quantity of the aggregate, and the dimensional size of the parallel slits be such that the aggregate will move into the slits by gravity as the slits are being formed. It is preferred that the slits be created parallel to each other, although some dehydration would take place if this were not the case. The slits could be formed before the heated aggregate were placed on the ground surface, and then the aggregate could be subsequently filled into the slits, but this procedure would be less efficient than the method described heretofore.

Therefore, from the foregoing, it is seen that this invention will achieve its stated objectives.

I claim:

1. The method of dehydrating wet soil, comprising,
   heating particulate aggregate material to a temperature substantially above the existing atmospheric temperature,
   spreading said heated aggregate on the wet soil to be dehydrated,
   cutting a plurality of slits in said soil to permit said heated aggregate to fall into the slits, whereby the heated aggregate will heat the soil and induce evaporation of the moisture therein.

2. The method of claim 1 wherein said slits are cut in the soil before said heated aggregate is deposited on the soil.

3. The method of claim 1 wherein said slits are cut in a parallel direction with each other.

4. The method of claim 1 wherein said slits are substantially narrow in proportion to their depth.

5. The method of claim 1 wherein said aggregate is of a texture and of a sufficient thickness on said ground, and the slits are of sufficient width and depth, that said slits will be filled by said aggregate through the force of gravity as said slits are being cut.

6. The method of claim 1 wherein said slits have a depth in excess of ten times the width thereof.

7. The method of claim 3 wherein the slits are spaced apart a distance less than the depth thereof.

8. The method of claim 1 wherein said aggregate is heated to a temperature of between 125° Fahrenheit to 600° Fahrenheit.

* * * * *